United States Patent
Tanaka (10) Patent No.: US 8,810,793 B2
(45) Date of Patent: *Aug. 19, 2014

(54) COLOR MEASUREMENT DEVICE AND METHOD FOR DETECTING MALFUNCTION OF COLOR MEASUREMENT DEVICE

(75) Inventor: Takayuki Tanaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/188,786

(22) Filed: Jul. 22, 2011

(65) Prior Publication Data

US 2012/0026499 A1    Feb. 2, 2012

(30) Foreign Application Priority Data

Jul. 28, 2010  (JP) ................. 2010-169013

(51) Int. Cl.
| | |
|---|---|
| *G01J 3/46* | (2006.01) |
| *H04N 1/60* | (2006.01) |
| *B41J 2/21* | (2006.01) |
| *B41J 29/38* | (2006.01) |
| *B41J 13/22* | (2006.01) |

(52) U.S. Cl.
CPC ............... *B41J 29/38* (2013.01); *H04N 1/6044* (2013.01); *B41J 2/2132* (2013.01); *B41J 13/22* (2013.01)
USPC ........................................................ 356/402

(58) Field of Classification Search
USPC ........................................................ 356/402
See application file for complete search history.

(56) References Cited

U.S. PATENT DOCUMENTS

| | | | |
|---|---|---|---|
| 5,823,525 A | 10/1998 | Miki | |
| 2002/0036778 A1* | 3/2002 | Wagner et al. | 356/406 |
| 2006/0214512 A1 | 9/2006 | Iwata | |
| 2008/0252948 A1* | 10/2008 | Onishi | 358/504 |
| 2010/0127451 A1 | 5/2010 | Rozenfeld et al. | |
| 2011/0025368 A1* | 2/2011 | Tsuchiya | 399/37 |
| 2012/0023382 A1 | 1/2012 | Sandhu et al. | |
| 2012/0026500 A1* | 2/2012 | Tanaka | 356/402 |

FOREIGN PATENT DOCUMENTS

| | | |
|---|---|---|
| JP | 63-295327 A | 12/1988 |
| JP | 09-030663 A | 2/1997 |
| JP | 2005-082380 A | 3/2005 |
| JP | 2008-275587 A | 11/2008 |
| JP | 2008-281549 A | 11/2008 |

* cited by examiner

*Primary Examiner* — Tarfur Chowdhury
*Assistant Examiner* — Omar Nixon
(74) *Attorney, Agent, or Firm* — Global IP Counselors, LLP (57) ABSTRACT

The present invention is a color measurement device for color measurement of a printed pattern printed onto a medium, the color measurement device characterized by comprising a pressing member for pressing the medium; a color measurement section for performing color measurement of the printed pattern; a power supply for outputting power for the pressing member to press the medium; a detection section for detecting displacement of an output section of the power supply; and a controller for causing the color measurement section to perform color measurement of the printed pattern which was printed onto the medium pressed by the pressing member, the controller being adapted to reduce the power output by the power supply from a state in which the pressing member was pressed against the medium, and to detect a malfunction of the power supply on the basis of the detection result obtained from the detection section.

9 Claims, 9 Drawing Sheets

Fig. 10

COLOR MEASUREMENT DEVICE AND METHOD FOR DETECTING MALFUNCTION OF COLOR MEASUREMENT DEVICE

CROSS-REFERENCE TO RELATED APPLICATIONS

This application claims priority to Japanese Patent Application No. 2010-169013 filed on Jul. 28, 2010. The entire disclosure of Japanese Patent Application No. 2010-169013 is hereby incorporated herein by reference.

BACKGROUND

1. Technological Field

The present invention relates to a color measurement device and to a method of detecting malfunction of a color measurement device.

2. Background Technology

In cases where color measurement of a printed pattern is performed using an optical sensor or the like, accurate color measurement cannot take place if the distance between the sensor and the printed pattern is not appropriate. In particular, a printed pattern printed onto a medium may experience rippling or curling of the medium surface due to drying of ink or heat during fixation, resulting in inconsistent distance between the sensor and the medium. It has accordingly been contemplated to perform color measurement while the medium on which a printed pattern has been printed is restrained.

A known example of a method for stabilizing a medium involves a mechanism whereby a tabular bottom plate on which a paper medium rests is pressed against a roller disposed in opposition to the bottom plate through operation of a pressurizing lever constituting an upward pushing member that contacts the outer plate, the pushing member being movable in the vertical direction (see, for example, Patent Citation 1).

Japanese Patent Application Publication No. 9-30663 (Patent Citation 1) is an example of the related art.

SUMMARY

Problems to be Solved by the Invention

However, inability to verify whether pressing is taking place at an appropriate level of pressing force is a problem encountered with mechanisms for stabilizing a medium such as that described above.

With the foregoing in view, it is one of advantages of the invention to provide a color measurement device and a method of detecting malfunction of a color measurement device, whereby it is possible to detect the state of pressing of a medium.

Means Used to Solve the Above-Mentioned Problems

The invention principally resides in a color measurement device for performing color measurement of a printed pattern printed onto a medium, the color measurement device characterized by comprising a pressing member for pressing the medium; a color measurement section for performing color measurement of the printed pattern; a power supply for outputting power for the pressing member to press the medium; a detection section for detecting displacement of an output section of the power supply; and a controller for causing the color measurement section to perform color measurement of the printed pattern printed onto the medium pressed by the pressing member, the controller being adapted to reduce the power output by the power supply from a state in which the pressing member is pressed against the medium, and to detect a malfunction of the power supply on the basis of the detection result obtained from the detection section.

Other features of the invention will be apparent from the disclosure of the present Specification and the appended drawings.

BRIEF DESCRIPTION OF THE DRAWINGS

Referring now to the attached drawings which form a part of this original disclosure.

DETAILED DESCRIPTION OF EXEMPLARY EMBODIMENTS

At a minimum, the following will be apparent from the disclosure of the present Specification and the appended drawings.

There will be apparent a color measurement device for performing color measurement of a printed pattern printed onto a medium, the color measurement device characterized by comprising a pressing member for pressing the medium; a color measurement section for performing color measurement of the printed pattern; a power supply for outputting power for the pressing member to press the medium; a detection section for detecting displacement of an output section of the power supply; and a controller for causing the color measurement section to perform color measurement of the printed pattern printed onto the medium pressed by the pressing member, the controller being adapted to reduce the power output by the power supply from a state in which the pressing member is pressed against the medium, and to detect a malfunction of the power supply on the basis of the detection result obtained from the detection section.

According to this color measurement device, malfunction of the power supply can be detected on the basis of the detection result obtained from the detection section, in a state in which the pressing member remains disposed at the pressing position.

Preferably, the color measurement device has a transmission section for decelerating the power of the power supply and transmitting the reduced power to the pressing member to the pressing member. Also, preferably, the device has a transmission section for reducing displacement of the output section of the power supply and causing the pressing member to be displaced, and for increasing displacement of the pressing member, and causing the output section to be displaced. As a consequence thereof, displacement of the output section of the power supply is greater, and malfunction of the power supply is easily detected.

In the color measurement device, preferably, the color measurement section rests on the pressing member when the color measurement section performs color measurement of the printed pattern. As a consequence thereof, the distance between the color measurement section and the medium is kept constant, making accurate color measurement possible.

In the color measurement device, preferably, the controller reduces the power output by the power supply for the purpose of detecting malfunction of the power supply, when the color measurement section is resting on the pressing member. As a consequence thereof, the medium can be maintained in the pressed state, even when the power output by the power supply has been reduced.

In the color measurement device, preferably, the controller reduces the power output by the power supply for the purpose of detecting a malfunction of the power supply, while causing the color measurement section to perform color measurement of the printed pattern. As a consequence thereof, the color measurement process can be completed quickly.

There will also be apparent a method for detecting a malfunction of a color measurement device, characterized by comprising a step of pressing a pressing member against a medium using power output by a power supply; a step of performing color measurement of a printed pattern printed onto the medium being pressed by the pressing member; and a step of reducing the power output by the power supply from a state in which the pressing member presses the medium, and detecting a malfunction of the power supply on the basis of the detection result obtained from a detection section for detecting displacement of the output section of the power supply.

According to this method, malfunction of the power supply can be detected on the basis of the detection result obtained from the detection section, in a state in which the pressing member remains disposed at the pressing position.

Summary of Printer 1 Provided with Color Measurement Device

Figure 1:
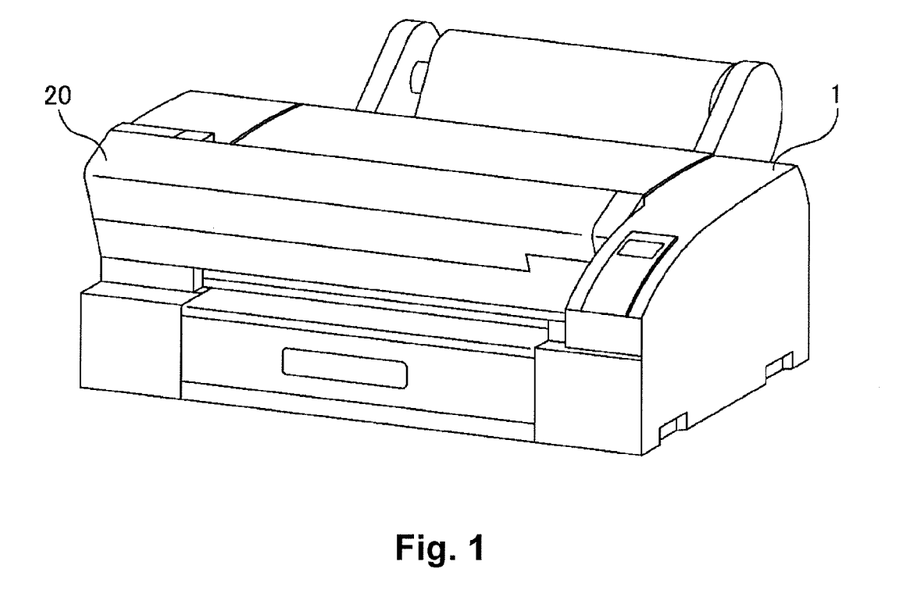
FIG. 1 is a perspective view depicting a printer provided with a color measurement device according to the present embodiment.
Figure 2:
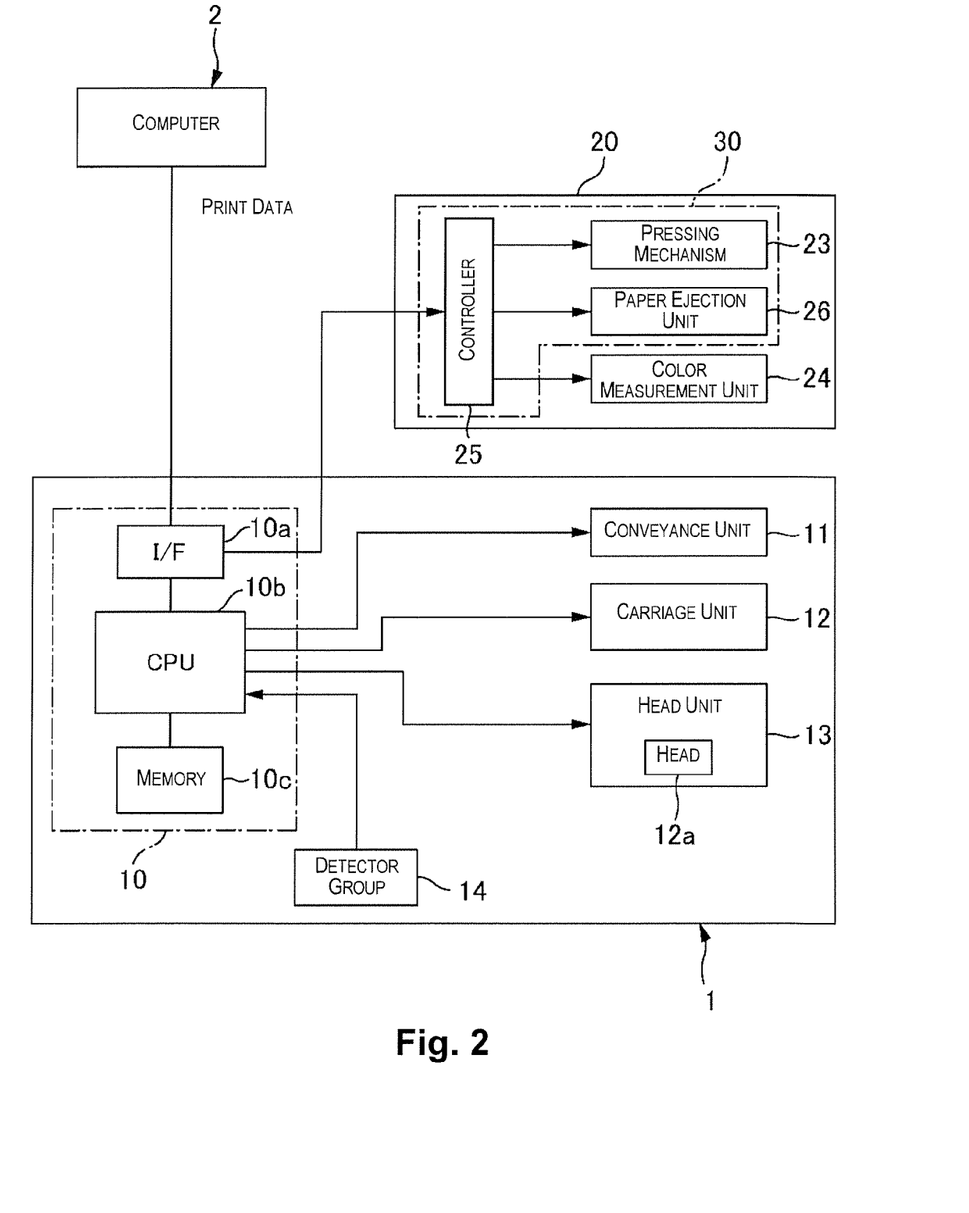
FIG. 2 is a general schematic block diagram of the printer provided with the color measurement device of the present embodiment.
Figure 3:
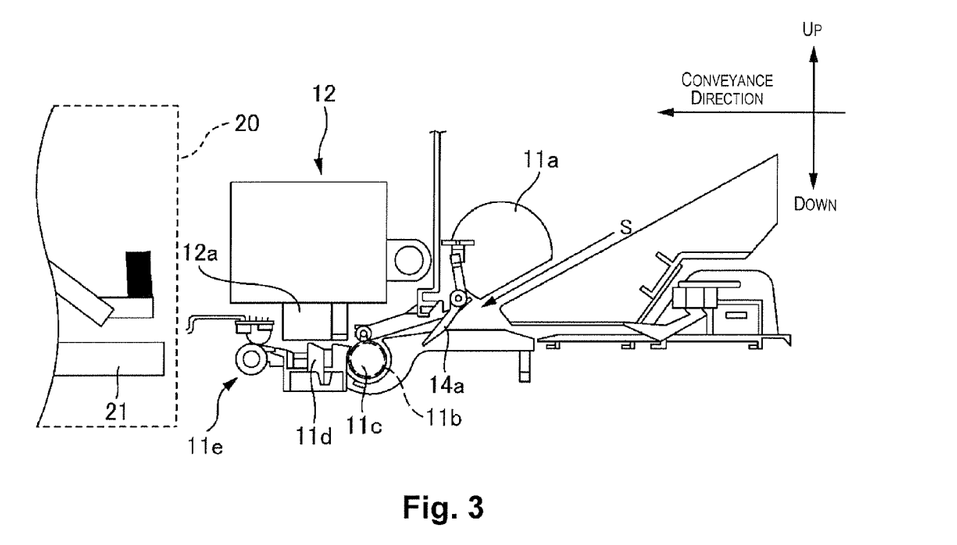
FIG. 3 is a longitudinal sectional view depicting the configuration of the printer of the present embodiment.

FIG. 1 is a perspective view of a printer provided with a color measurement device according to the present embodiment. FIG. 2 is a general schematic block diagram of the printer 1 provided with the color measurement device of the present embodiment. FIG. 3 is a longitudinal sectional view depicting the configuration of the printer 1 of the present embodiment. There shall first be provided a brief description of the basic configuration of a printer provided with the color measurement device according to the invention. As depicted in FIG. 3, the color measurement device 20 is disposed on the downstream end of a paper ejection roller unit 11e in the conveyance direction of the printer 1.

As an example of a printing device provided with the color measurement device 20 according to the invention, taking the example of an inkjet printer (hereinafter also called the printer) 1 in which ink is ejected from nozzles and in which the color measurement device 20 is provided as an option as depicted in FIG. 1, there shall be described an embodiment in a printing system in which the printer 1 provided with the color measurement device 20 having a paper pressing device 30 is connected to a computer 2 as depicted in FIG. 2.

Configuration of Printer 1

As depicted in FIG. 2, in the printer 1 of the present embodiment, print data is received from an external device; i.e., the computer 2; and an image is formed on a medium of paper S, a number of units (a conveyance unit 11, a carriage unit 12, and a head unit 13) being controlled by a control section 10. Conditions inside the printer 1 are monitored by a detector group 14, the control section 10 controlling the units on the basis of the detected results thereof.

The control section 10 is a control unit for carrying out control of the printer 1. The purpose of an interface section 10a is to carry out sending and receiving of signals among the external device; i.e., the computer 2, the color measurement device 20, and the printer 1. The purpose of a memory 10c is to ensure the presence of a region for a CPU 10b to save programs, a work region, or the like. The CPU 10b controls, e.g., the conveyance unit 11 and the carriage unit 12 in accordance with a computer program (firmware or the like) stored in the memory 10c. The printer 1 of the present embodiment is configured such that, in cases that a given operation of a device connected via the interface section 10a or of an internal electronic component of the printer 1 is detected to have continued for a predetermined time, error information is communicated, and control of the printer 1 is halted. Here, the predetermined time is set to a time; for example, 30 seconds, for which no electronic component would continue a given operation during normal operation of the printing device.

As depicted in FIG. 3, the purpose of the conveyance unit 11 is to infeed the paper S to the printable position, then convey the paper S a predetermined conveyance amount in the conveyance direction during printing. The unit has a paper supply roller 11a, a conveyance motor 11b, a conveyance roller 11c, a platen 11d, and a paper ejection roller unit 11e. The paper supply roller 11a rotates and sends the paper S to be printed to the conveyance roller 11c. Once a paper-detecting sensor 14a detects the position of the leading edge of the paper S sent from the paper supply roller 11a, the control section 10 rotates the conveyance roller 11c and positions the paper S at the printing start position. Once the paper S is positioned at the printing start position, at least some of the nozzles of a head 12a oppose the paper S.

The purpose of the carriage unit 12 is to transport the head 12a in an intersecting direction (hereinafter also called the "transport direction") that intersects the conveyance direction. In the present printer 1, it is possible for ink to ejected from any of the nozzles during transport in either direction in the transport direction.

With the printer 1 of the present embodiment, it is possible to print out a variety of types of printed patterns on the basis of print data sent from the computer 2, or on the basis of internally stored print data. The printed patterns are, for example, printed patterns for making density adjustments or printing position adjustments in the printer 1, the patterns being composed of a plurality of sub-patterns lined up in a direction constituting the conveyance direction of the paper S.

Configuration of Color Measurement Device 20

Figure 4:
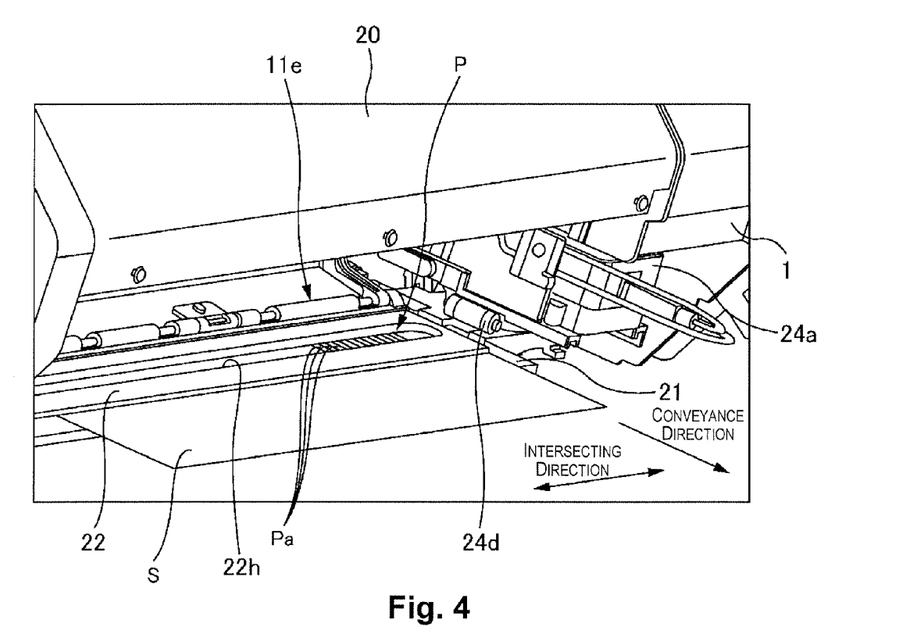
FIG. 4 is a perspective view of the color measurement device of the present embodiment viewed from the paper ejection unit end of the printer.

FIG. 4 is a perspective view of the color measurement device of the present embodiment viewed from the paper ejection unit end of the printer.

For the purposes of performing color measurement of a printed pattern P that has been printed by the printer 1, the color measurement device 20 of the present embodiment is configured such that the paper S ejected from the paper ejection roller unit 11e of the printer 1 is conveyed to the color measurement position of the color measurement device 20 as depicted in FIGS. 3 and 4. In the printing pattern P of the present embodiment, a plurality of sub-patterns Pa of different color or density are disposed to line up in an intersecting direction that intersects the conveyance direction of the paper S. The color measurement device 20 performs color measurement of the plurality of sub-patterns at a color measurement position to the downstream end from the paper ejection roller unit 11e of the printer 1. In FIG. 4, some of the reference numerals of the sub-patterns Pa are omitted.

Figure 5:
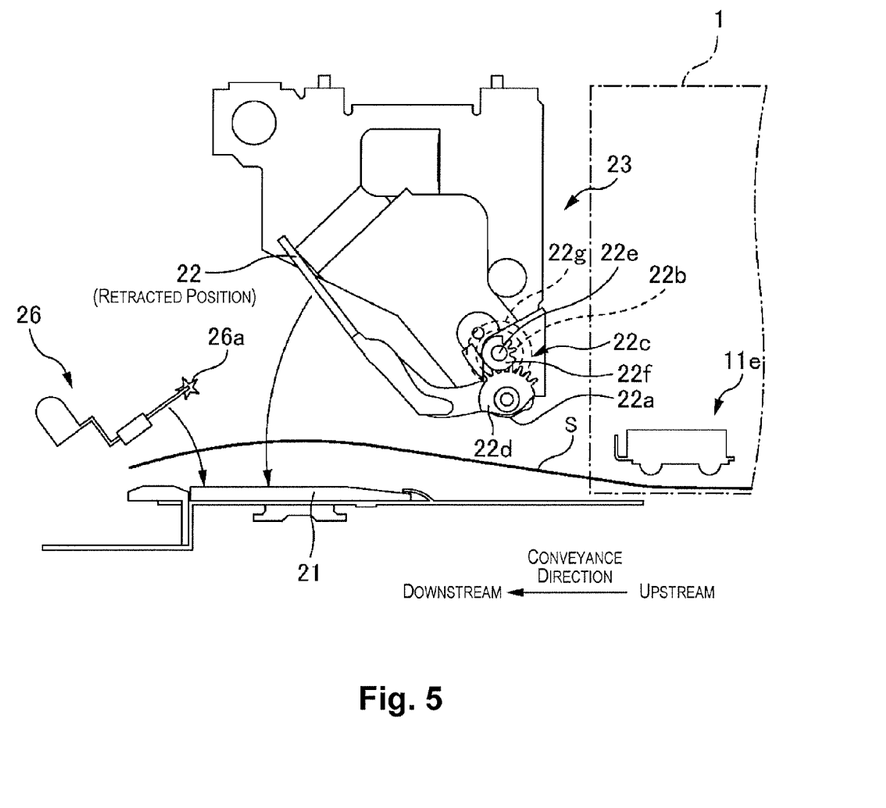
FIG. 5 is a diagram depicting a simplified schematic of a pressing mechanism.
Figure 6:
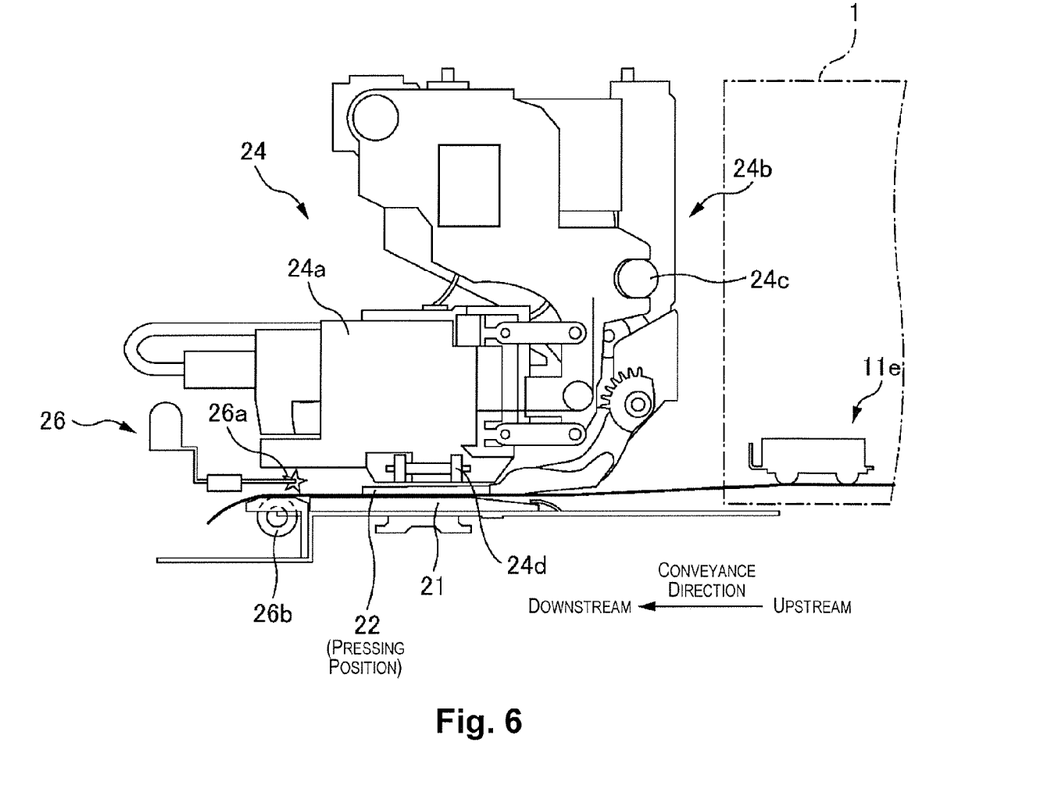
FIG. 6 is a diagram depicting a simplified schematic of a color measurement unit.

FIG. 5 is a diagram depicting a simplified schematic of a pressing mechanism. FIG. 6 is a diagram depicting a simplified schematic of a color measurement unit.

As depicted in FIGS. 5 and 6, the color measurement device 20 is provided with a conveyance guide 21, a paper pressing member 22, a pressing mechanism 23, a color measurement unit 24, a controller 25 (see FIG. 2), and a paper ejection unit 26. The conveyance guide 21 is a member for guiding the paper S being ejected from the printer 1. The paper pressing member 22 is a member that functions as a pressing member for pressing the paper S of the conveyance guide 21 towards the conveyance guide 21. The pressing mechanism 23 is a mechanism for transporting of the paper pressing member 22 between a pressing position (a position at which the paper pressing member 22 presses against the paper S) and a retracted position (a position at which the paper pressing member 22 has been retracted). The color measurement unit 24 performs color measurement of the printed pattern P printed onto the paper S. The controller 25 controls the pressing mechanism 23 and the color measurement unit 24 of the color measurement device 20. The paper ejection unit 26 ejects the paper S having been subjected to color measurement.

The conveyance guide 21 is a tabular member furnished to the downstream end in the conveyance direction from the paper ejection roller unit 11e of the printer 1. The conveyance guide 21 is furnished at a position slightly below the position at which the paper S is ejected from the paper ejection roller unit 11e. The conveyance guide 21 has width sufficiently greater than the width of the paper S in the intersecting direction, and is flat at the positions thereof where the paper S is conveyed, and where color measurement is to be performed.

The paper pressing member 22 is a tabular member having elongated contours, the member being disposed such that the lengthwise direction thereof is oriented in the intersecting direction. An opening 22h (see FIG. 4) is formed along the intersecting direction in the paper pressing member 22. The paper pressing member 22 is formed to be wider in the intersecting direction than the width of the paper S being conveyed. The opening 22h is slightly narrower than the width of the paper S in the intersecting direction. Because of this, when the paper S conveyed over the conveyance guide 21 is pressed by the paper pressing member 22, the area of the paper S where the printed pattern P has been printed is exposed through the opening 22h.

The pressing mechanism 23 has a rotating shaft 22a, a DC motor 22b, and a gear train 22c. The rotating shaft 22a is furnished at the edge section of the upstream end of the paper pressing member 22 in the conveyance direction, the lengthwise direction thereof being oriented along the intersecting direction. The rotating shaft 22a is rotatably disposed about an axis coincident with the lengthwise direction. The paper pressing member 22 is attached to the rotating shaft 22a; and, as the rotating shaft 22a rotates, the paper pressing member 22 rotates about the rotating shaft 22a as its axis. The DC motor 22b is a power supply controlled by the controller 25 in order to cause the rotating shaft 22a to rotate. The gear train 22c is a gear train for transmitting the power of the DC motor 22b to the rotating shaft 22a. The gear train 22c has a first gear 22d furnished at one end section of the rotating shaft 22a, and second gear 22f furnished to a motor shaft 22e. The motor shaft 22e corresponds to the output section of the DC motor 22b. The first gear 22d and the second gear 22f are set to a reduction gear ratio of approximately 1/40. The gear train 22c corresponds to a transmission section for decelerating the power of the DC motor 22b for transmission to the paper pressing member 22. Specifically, the gear train 22c corresponds to a transmission section for reducing displacement of the motor shaft 22e of the DC motor 22b to displace the paper pressing member 22, and for increasing displacement of the paper pressing member 22 to displace the motor shaft 22e. An encoder 22g is furnished as the detection section for detecting rotational displacement of the motor shaft 22e.

With the paper pressing member 22 in the retracted position, when electrical current of a predetermined direction is then supplied to the DC motor 22b, the paper pressing member 22 is transported about the rotating shaft 22a and brought to face the upper face of the conveyance guide 21, the lower face of the paper pressing member 22 within opposition to the upper face of the conveyance guide 21. Once the paper pressing member 22 and the conveyance guide 21 are in opposition, if electrical current of the predetermined direction continues to be supplied to the DC motor 22b, pressing force (torque) will be generated by the paper pressing member 22 pressing against the conveyance guide 21. If electrical current of the reverse direction of the predetermined direction is supplied to the DC motor 22b, the paper pressing member 22 will be transported about the rotating shaft 22a in the direction away from the upper face of the conveyance guide 21.

The color measurement unit 24 has a color measurement section 24a composed of a photosensor leading to the controller 25; and a color measurement section transport mechanism 24b for transporting the color measurement section 24a in the intersecting direction. The color measurement section 24a has, for example, a light-emitting section and a light-receiving section; and performs color measurement, on the basis of the quantity of light received by the light-receiving section, of light emitted by the light-emitting section and then reflected from the printed pattern P.

In the color measurement section transport mechanism 24b, a color measurement section transport motor (not shown) for transporting the color measurement section 24a in the intersecting direction transmits [power] to a belt (not shown) affixed to the color measurement section 24a, [the color measurement section 24a] being provided so as to be transportable in either direction along a guide shaft 24c, on which it is guided in the intersecting direction. In the color measurement section 24a, a pulse motor may be used as the color measurement section transport motor (not shown), or position control may be performed using an encoder or the like. The controller can accordingly identify the sub-patterns Pa during color measurement, on the basis of the amount by which the color measurement section 24a is transported.

A transport roller 24d is furnished at the bottom end of the color measurement section 24a. The transport roller 24d is brought into rolling contact above the paper pressing member 22 during transport of the color measurement section 24a, and is transported over the paper pressing member 22 while being guided by the paper pressing member 22. As the color measurement section 24a is being transported while traveling over the paper pressing member 22 that presses down on the paper S, the section carries out color measurement of the printed pattern P, which is exposed through the opening 22h of the paper pressing member 22. When the paper pressing member 22 releases pressure (when the paper pressing member 22 is transported to the retracted position), the color measurement section 24a retracts to a region away from above the paper pressing member 22. The guide shaft 24c is accordingly extended beyond the width of the paper pressing member 22 in the intersecting direction, so that the color measurement section 24a can retract from over the paper pressing member 22. Specifically, the color measurement section 24a can be transported between a region over the paper pressing member 22 where disposed during color measurement, and a region to the outside of the paper pressing member 22 in the intersecting direction, where disposed when color measurement is not taking place. The processes of the controller 25 shall be discussed further below.

The paper ejection unit 26 is composed of a pair of upper and lower rollers 26a, 26b disposed downstream of the color measurement position, the lower roller 26b being controlled by the controller 25 to convey the paper S.

Color Calibration Process

Figure 7:
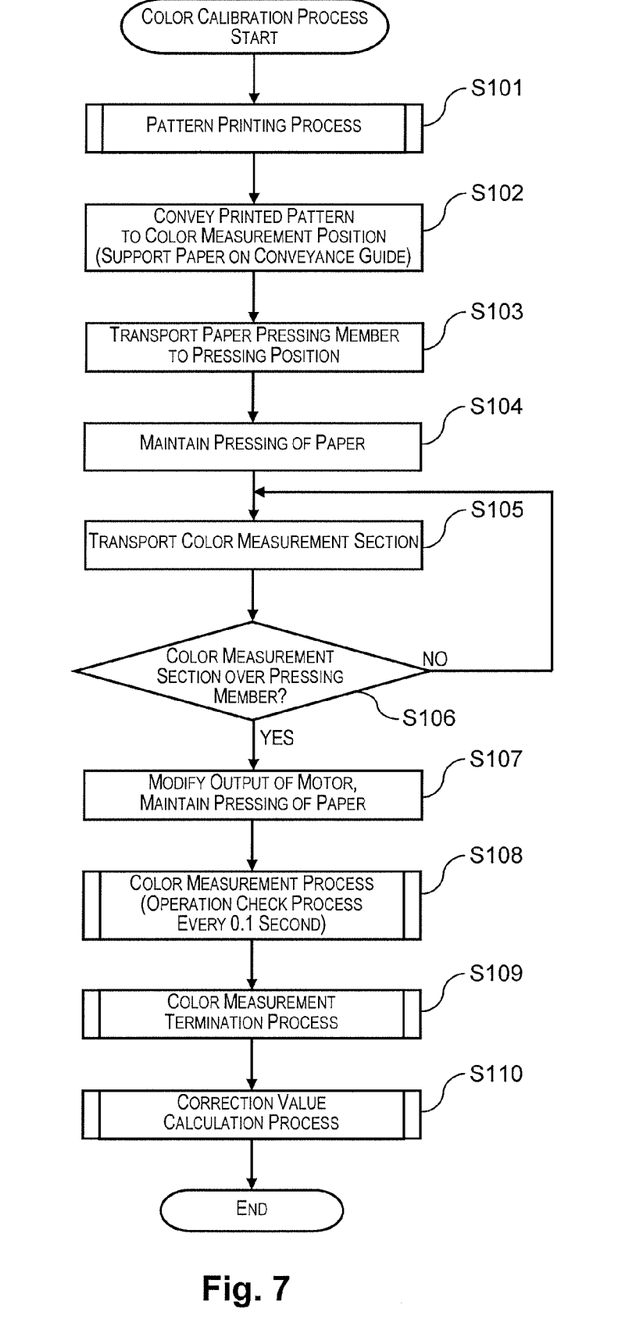
FIG. 7 is a flowchart for describing a color calibration process.

FIG. 7 is a flowchart for describing a color calibration process.

First, the printer 1 executes printing of the printed pattern P (pattern printing process, S101). Because printing of the printed pattern P can be performed by the printer 1 according to known printing techniques, a description of the printing of the printed pattern P is omitted here. The printed pattern P printed by the printer 1 is a printed pattern P of a plurality of sub-patterns Pa lined up in the intersecting direction onto the paper S.

Next, the printer 1 conveys the paper S until the printed pattern P of the paper S reaches the color measurement position and the paper S is supported on the conveyance guide 21 (S102). At this time, the paper pressing member 22 is in the retracted position as depicted in FIG. 5. When the printed pattern P has reached the color measurement position of the color measurement device 20, the printer 1 halts conveying of the paper S. As depicted in FIG. 5, the conveyed paper S may rise above the conveyance guide 21 in certain cases. If the color measurement 24 performs color measurement of the printed pattern P in this state, there is a risk of inconsistent distance between the color measurement section 24a and the printed pattern P, so that accurate color measurement cannot take place.

Next, the color measurement device 20 transports the paper pressing member 22 to the pressing position to inhibit the paper S from rising above the conveyance guide 21 (S103). At this time, the controller 25 of the color measurement device 20 drives the DC motor 22b and transports the paper pressing member 22 from the retracted position to the pressing position (see FIG. 6). The power of the DC motor 22b is transmitted to the rotating shaft 22a via the gear train 22c, whereupon the paper pressing member 22 is transported about the rotating shaft 22a and brought to face the upper face of the conveyance guide 21, the lower face of the paper pressing member 22 being in opposition to the upper face of the conveyance guide 21. By virtue of the paper S being sandwiched between the lower face of the paper pressing member 22 and the upper face of the conveyance guide 21, the printed pattern P exposed through the opening 22h of the paper pressing member 22 will be corrected to a flat state even if the paper S curls. Based on the detection result obtained from the encoder 22g, the controller 25 detects that the paper pressing member 22 has been transported to the pressing position.

Incidentally, after the paper pressing member 22 has been transported to the pressing position, if the controller 25 happens to halt the DC motor 22b, there is a risk of the paper S pushing the paper pressing member 22 upward so that the paper S again rises above the conveyance guide 21. For this reason, the controller 25 continues to supply a predetermined electrical current to the DC motor 22b even after the paper pressing member 22 has been transported to the pressing position, so that the DC motor 22b continues to output power for pressing the paper pressing member 22 against the paper S. As a consequence thereof, the paper S is prevented from rising above the conveyance guide 21.

Next, the controller 25 transports the color measurement section 24a (S105). On starting to be transported, the color measurement section 24a is disposed in a region to the outside of the paper pressing member 22. However, as the color measurement section 24a continues to be transported (NO in S106→S105), the color measurement section 24a reaches a point over the paper pressing member 22. If the controller 25 determines that the color measurement section 24a is positioned over the paper pressing member 22 (YES in S106), it changes the power output by the DC motor 22b (S107).

The output of the DC motor 22b in S107 may be lower than the output of the DC motor 22b in Step S104. This is because the color measurement section 24a is located above the paper pressing member 22, and therefore the weight of the color measurement section 24a bears down on the paper pressing member 22 via the transport roller 24d, pressing the paper S.

The controller 25 may vary the output of the DC motor 22b in S107 depending on the type of paper (the pressing force may be varied as well). For example, in the case of thick paper, the upward pushing force of the paper S on the paper pressing member 22 will be stronger; therefore, the controller 25 may make the output of the DC motor 22b stronger (make the pressing force stronger) than with thin paper. Also, in cases where the paper S is wider, the upward pushing force of the paper S on the paper pressing member 22 will be stronger; therefore, the controller 25 may make the output of the DC motor 22b stronger than with narrower paper.

Next, the controller 25 executes a color measurement process while causing the paper pressing member 22 to press the paper S (S108). At this time, the controller 25 transports the color measurement section 24a over the paper pressing member 22 while causing the paper pressing member 22 to guide the transport roller 24d. The controller 25 then causes the color measurement section 24a to perform color measurement of the printed pattern P exposed through the opening 22h of the paper pressing member 22. Because the color measurement section 24a is transported while the transport roller 24d rolls over the paper pressing member 22 as the paper pressing member 22 is pressing the paper S, the distance between the color measurement section 24a and the printed pattern P is kept constant. Because of this, accurate color measurement is possible.

During the color measurement process, the controller 25 executes an operation check process every 0.1 second. In this operation check process, a check for termination of the color measurement process and an operation check of the motor 22b are carried out. The operation check process will be described further below.

After the color measurement process terminates, the controller 25 executes a color measurement completion process (S109). Specifically, the controller 25 transports the color measurement section 24a to a region outside of the paper pressing member 22, transports the paper pressing member to the retracted position, and thereafter ejects the paper S.

Finally, on the basis of the color measurement results acquired in the color measurement process (S108), the control section 10 of the printer 1 calculates correction values for color calibration, and stores these in the memory 10c (S110). It is possible for the correction value calculation process to be performed using known color calibration techniques, and therefore a description thereof is omitted here.

Operation Check Process

Figure 8:
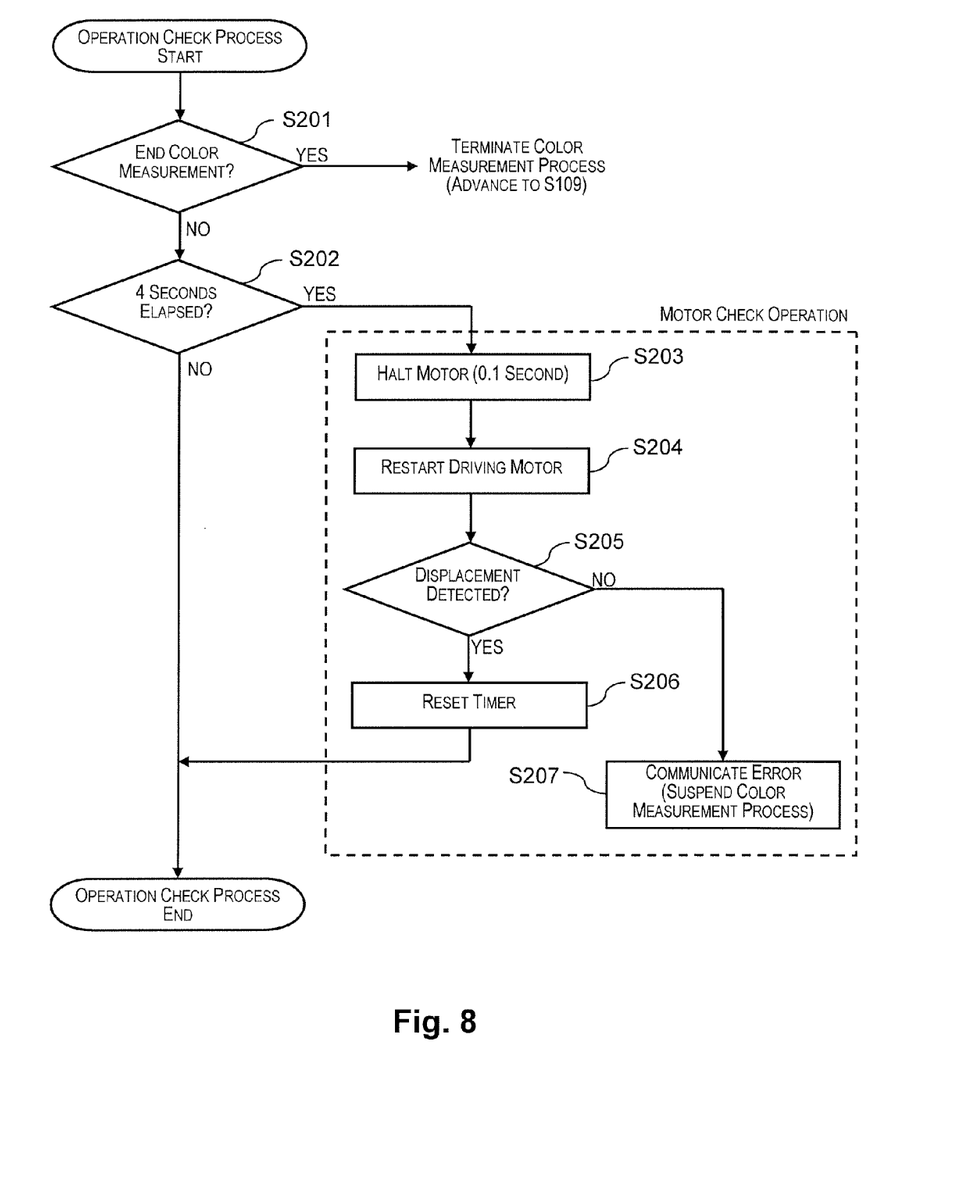
FIG. 8 is a flowchart for describing an operation check process.

FIG. 8 is a flowchart for describing the operation check process. As described previously, this operation check process is executed each 0.1 second during the color measurement process (S108 in FIG. 7). Through this operation check process, a color measurement process termination decision is carried out every 0.1 second, and a decision as to whether the motor is operating normally (motor check process) is carried out every 4 seconds.

First, the controller 25 determines whether the color measurement process has terminated (S201). A termination flag is set once color measurement of all of the sub-patterns Pa of the printed pattern P in S108 has terminated, and if the termination flag has been set at the time of the decision of S201, the controller 25 determines that the color measurement process has terminated (YES in S201). If the termination flag has not been set at the time of the decision of S201 (NO in S201), the controller 25 determines that the color measurement process is still in progress.

Next, the controller 25 determines whether 4 seconds has elapsed since the color measurement process started (or since a timer was last reset in S206 (discussed further below)). If 4 seconds has not yet elapsed (NO in S202), the controller 25 terminates the operation check process and proceeds with the color measurement process. If 4 seconds has passed (YES in S202), the controller 25 carries out the motor check process (S203 to S207). As a consequence thereof, the motor check process is carried out every 4 seconds during the interval that the color measurement process is carried out.

The necessity for performing a motor check process every 4 seconds shall now be described before the specific processes of the motor check process are described.

Figure 9A:
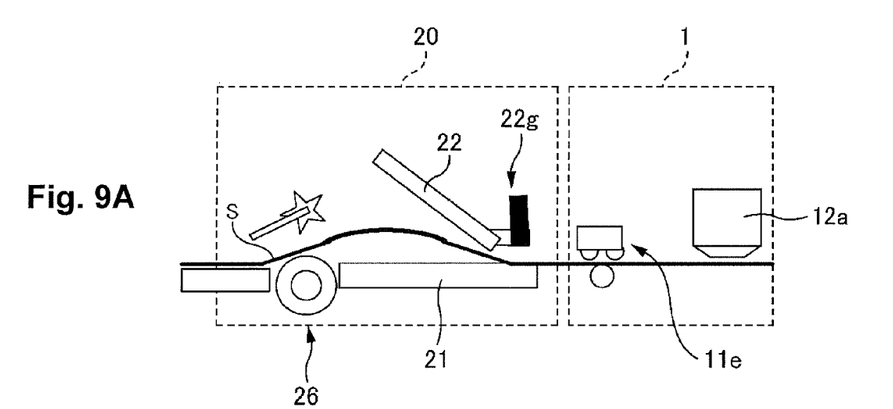
FIG. 9A is a schematic drawing depicting a state in which a paper pressing member is disposed in the retracted position.
Figure 9B:
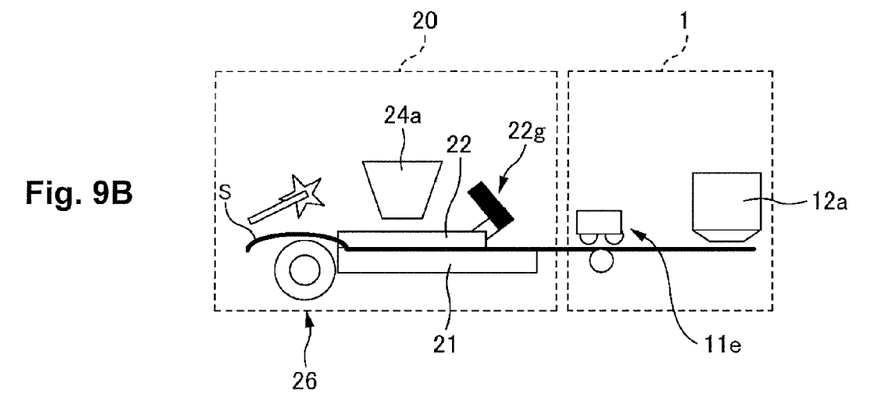
FIG. 9B is a schematic drawing depicting a state in which the paper pressing member is pressing the paper.
Figure 9C:
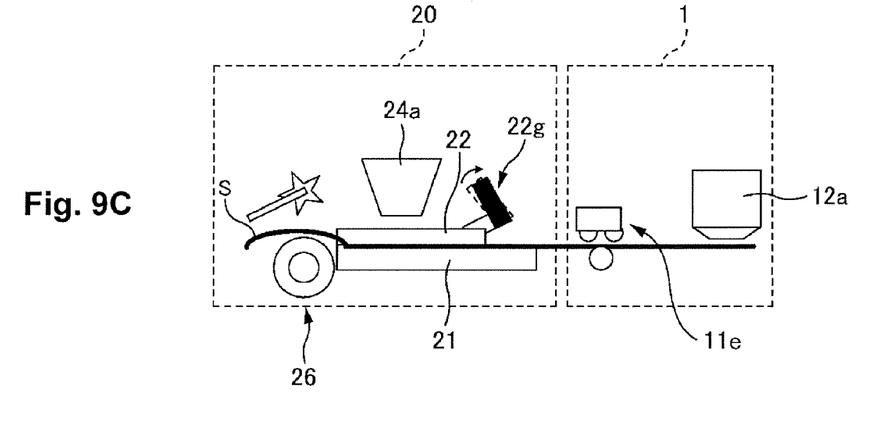
FIG. 9C is a drawing depicting a state in which supply of electrical current to a DC motor is halted from a state in which pressure is being applied by the paper pressing member.

FIG. 9A is a schematic drawing depicting a state in which the paper pressing member is disposed in the retracted position. FIG. 9B is a schematic drawing depicting a state in which the paper pressing member presses the paper. FIG. 9C is a drawing depicting a state in which supply of electrical current to the DC motor has halted in a state of pressing by the paper pressing member.

Here, in FIG. 9C, an image of the encoder 22g in a state of pressing by the paper pressing member 22 is depicted by alternately dotted and dashed lines, and an image of the encoder 22g when electrical current supplied by the DC motor 22b has been reduced is depicted by solid lines.

When the paper pressing member 22 is transported from the retracted position of FIG. 9A to the pressing position of FIG. 9B (S103 of FIG. 7), because the motor shaft 22e of the DC motor 22b rotates in association with transport of the paper pressing member 22, it is possible for the encoder 22g to detect the amount of rotational displacement of the motor shaft 22e. In contrast, when the paper pressing member 22 continues to press the paper S at the pressing position of FIG. 9B (S107 and S108 of FIG. 7), the paper pressing member 22 is not transported even if the DC motor 22b continues to output power; therefore, since the motor shaft 22e does not rotate, the encoder 22g does not detect the amount of rotational displacement of the motor shaft 22. As a result, when the paper pressing member 22 continues to press the paper S at the pressing position of FIG. 9B (S107 and S108 of FIG. 7), the controller 25 cannot determine that the DC motor 22b is malfunctioning on the basis of the detection result obtained from the encoder 22g. Accordingly, in the present embodiment, the controller 25 determines the DC motor 22b is malfunctioning by executing the motor check process.

Also, due to its being furnished as an option of the printer 1, the color measurement device 20 must operate without impeding control of the printer 1. As discussed previously, the printer 1 is configured such that, in cases that a given operation of a device connected via the interface section 10a or of the motor or other internal electronic component of the printer 1 is detected to have continued for a 30 seconds, error information is communicated, and control of the printer 1 is halted. In cases where the printed pattern P for color measurement by the color measurement device 20 is large or contains a large number of sub-patterns Pa, it is conceivable that the color measurement process could take 30 seconds or more. At this time, if the DC motor 22b continues to operate continuously for 30 seconds or more during the color measurement process, there is a risk that control of the printer 1 will be halted. Accordingly, in the present embodiment, the motor check process is executed every 4 seconds in a cycle shorter than 30 seconds, and the electrical current supplied to the DC motor 22b is reduced during the motor check process, whereby the DC motor 22b is prevented from operating continuously for 30 seconds or more.

Next, the processes of the motor check process are described.

First, the controller 25 halts the supply of electrical current to the DC motor 22b, bringing output of the DC motor 22b to a halt (S203). As a consequence thereof, the power output by the DC motor 22b assumes a state of being lower than the state of FIG. 9B. In FIG. 9B, because the DC motor 22b continues to output power in a state in which the paper pressing member 22 is not transported, slight elastic deformation arises in the paper pressing member 22 and in the pressing mechanism 23; however, once output of the DC motor 22b halts (is reduced), the paper pressing member 22 and the pressing mechanism 23 recover from the elastic deformation. As a result, and as depicted in FIG. 9C, despite the paper pressing member 22 still being disposed at the pressing position without being transported, the motor shaft 22e experiences rotational displacement in the opposite direction from the pressing direction. Further, because of the configuration whereby the output of the DC motor 22b is reduced for transmission to the paper pressing member 22 via the gear train 22c, the amount of rotational displacement of the motor shaft 22e in the state of FIG. 9C is amplified by the gear train 22c even if there is only slight elastic deformation of the paper pressing member 22 and the pressing mechanism 23c.

As depicted in FIG. 9C, during S203, because the color measurement section 24a rests on the paper pressing member 22, the weight of the color measurement section 24a bears down on the paper pressing member 22 via the transport roller 24d even if the DC motor 22b no longer outputs power for the purpose of the paper pressing member 22 to press the paper S. Because of this, a state in which the paper S is pressed is maintained without the paper pressing member 22 rising away from the paper S. As a consequence thereof, the motor check process can be executed while the color measurement section 24a carries out the color measurement process to carry out the color measurement of the printed pattern P; therefore, the color measurement process can be completed quickly.

Next, after the output of the DC motor 22b has been halted for 0.1 second, the controller 25 resumes supplying electrical current to the DC motor 22*b*, and restarts driving of the DC motor 22*b* (S204). At this time, the system returns from the state of FIG. 9C to the state of FIG. 9B. Specifically, the paper pressing member 22 and the pressing mechanism 23 again undergo elastic deformation, due to the DC motor 22*b* continuing to output power in a state in which the paper pressing member 22 is not transported. As a result, despite the paper pressing member 22 still being disposed at the pressing position without being transported, the motor shaft 22*e* undergoes rotational displacement in the pressing direction. In particular, because of a configuration whereby the output of the DC motor 22*b* is reduced for transmission to the paper pressing member 22 via the gear train 22*c*, the amount of rotational displacement of the motor shaft 22*e* is relatively large even if there is only slight elastic deformation of the paper pressing member 22 and the pressing mechanism 23.

Thus, on the basis of the detection result obtained from the encoder 22*g*, the controller 25 determines whether the motor shaft 22*e* has undergone rotational displacement in the pressing direction (S205). In the case that the motor shaft 22*e* is detected to have been subjected to rotational displacement (YES in S205), the controller 25 resets to 0 second the timer that was used in S202 for the decision as to whether 4 seconds has elapsed (S206). As a consequence thereof, the controller 25 again executes the motor check process after 4 seconds has elapsed from the process of S206 (YES in S202).

On the other hand, in the case that the motor shaft 22*e* is not detected to have been subjected to rotational displacement (NO in S205), it is conceivable that the DC motor 22*b* is not outputting power normally; therefore, the controller 25 communicates an error through a buzzer or display in the printer 1 (S207).

In S205, a decision is made as to whether the motor shaft 22*e* has undergone rotational displacement equal to or greater than a threshold value in the pressing direction. In this case, the controller 25 may change the threshold value setting according to the type of paper. For example, since the upward pushing force of the paper S on the paper pressing member 22 is stronger with thick paper, and the output of the DC motor 22*b* is accordingly stronger (the pressing force is stronger), the controller 25 may set a threshold value that is larger than when thin paper is used. Also, since the upward pushing force of the paper S on the paper pressing member 22 is stronger in cases where the paper S is wider, and the output of the DC motor 22*b* is accordingly stronger (the pressing force is stronger), the controller 25 may set a threshold value that is larger than when narrower paper is used.

According to the paper pressing device 30 of the present embodiment, the paper S is supported on the conveyance guide 21 (S102), and after the paper pressing member 22 is transported to the pressing position (S103), power continues to be output from the DC motor 22*b* and the paper pressing member 22 continues to press the paper S towards the conveyance guide 21 (S104, S107). However, because the motor shaft 22*e* does not rotate in this state, the controller 25 cannot determine whether there is a malfunction of the DC motor 22*b* on the basis of the detection result obtained from the encoder 22*g*. Thus, in the present embodiment, the controller 25 halts output of power by the DC motor 22*b* (S203) in a state where the paper pressing member 22 has pressed the paper towards the conveyance guide 21; and, utilizing the fact that the motor shaft 22*e* experiences rotational displacement in the opposite direction from the pressing direction at this time, detects a malfunction of the DC motor 22*b* on the basis of the detection result obtained from the encoder 22*g* (S205, S207). As a consequence thereof, malfunctioning of the DC motor 22*b* can be detected using the encoder 22*g* with the paper pressing member 22 in a state of being disposed at the pressing position.

According to the present embodiment, the paper pressing device 30 has a gear train 22*c* that reduces the power of the DC motor 22*b* and transmits the reduced power to the paper pressing member 22. When output of the DC motor 22*b* is halted and the paper pressing member 22 and the pressing mechanism 23 recover from elastic deformation, the amount of rotational displacement of the motor shaft 22*e* is amplified by the gear train 22*c*. As a consequence thereof, despite the fact that the amount of elastic deformation of the paper pressing member 22 and the pressing mechanism 23 is slight, the amount of rotational displacement of the motor shaft 22*e* is relatively great, and rotational displacement of the motor shaft 22*e* is easily detected by the encoder 22*g*.

Furthermore, according to the present embodiment, when the controller 25 causes the printed pattern P to be subjected to color measurement by the color measurement section 24*a*, the paper S is pressed against the paper pressing member 22. As a consequence thereof, it is possible to minimize instances of the paper S rising above the conveyance guide 21, and to perform color measurement in an accurate manner.

Furthermore, according to the present embodiment, the color measurement section 24*a* rests on the paper pressing member 22 when the color measurement section 24*a* performs color measurement of the printed pattern P. Because the color measurement process is carried out in a state with the color measurement section 24*a* resting on the paper pressing member 22 while the paper pressing member 22 presses the paper S, the distance between the color measurement section 24*a* and the printed pattern P is kept constant, and color measurement can be accurately performed.

Furthermore, according to the present embodiment, the controller 25 halts output of the DC motor 22*b* when the color measurement section 24*a* is resting on the paper pressing member 22. Since, at this time, the weight of the color measurement section 24*a* bears down on the paper pressing member 22, the paper pressing member 22 does not rise away from the paper S, and the paper S can be kept in a state of being pressed.

Furthermore, according to the present embodiment, the controller 25 halts output of the DC motor 22*b* (executes the motor check process) while color measurement of the printed pattern P is performed by the color measurement section 24*a* (while the color measurement process is being executed), and therefore the color measurement process can be completed quickly. In the present embodiment, because the weight of the color measurement section 24*a* bears down on the paper pressing member 22, it is possible for the motor check process to be executed while the color measurement process is being executed. If the color measurement process is interrupted during each motor check process, completion of the color measurement process will be delayed.

Modified Examples

In the motor check process of the aforementioned embodiment, the controller 25 detects a malfunction of the DC motor 22*b* on the basis of the detection result obtained from the encoder 22*g* (S205) once the output of the DC motor 22*b* (S203) has been halted and the driving of the DC motor 22*b* has been restarted (S204). However, the detecting of a malfunction on the basis of the detection result obtained from the encoder 22*g* is not limited to this timing.

Figure 10:
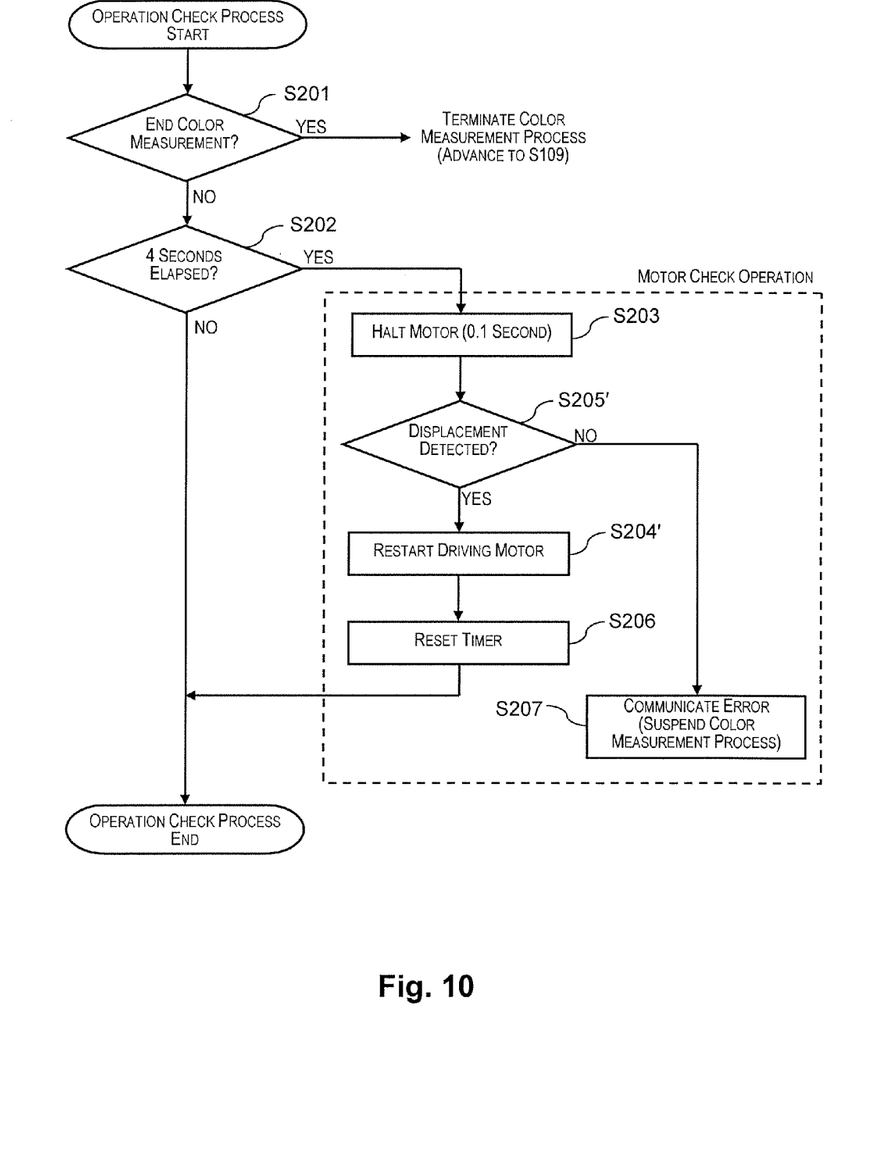
FIG. 10 is a flowchart for describing an operation check process of a modified example.

FIG. 10 is a flowchart for describing an operation check process of a modified example. This modified example differs from that depicted in FIG. 8 in that malfunctioning of the DC motor 22b is detected on the basis of the detection result obtained from the encoder 22g before driving of the DC motor 22b is restarted.

As has been described above, once the output of the DC motor 22b is halted in S203, the paper pressing member 22 and the pressing mechanism 23 recover from elastic deformation, and the motor shaft 22e experiences rotational displacement in the opposite direction from the pressing direction. Thus, in the modified example, immediately after the output of the DC motor 22b is halted in S203, the controller 25 determines whether the motor shaft 22e has undergone rotational displacement in the opposite direction from the pressing direction (S205'). If the motor shaft 22e has not undergone rotational displacement in the opposite direction from the pressing direction (NO in S205'), it is conceivable that the DC motor 22b has not been operating normally since before output of the DC motor 22b was halted, and that the paper pressing member 22 may not be pressing the paper S normally; therefore, the controller communicates an error (S207).

In S205', a decision may be made as to whether the motor shaft 22e has undergone rotational displacement equal to or greater than a threshold value in the opposite direction from the pressing direction. In this case, the controller 25 may change the threshold value setting according to the type of paper. For example, since the upward pushing force of the paper S on the paper pressing member 22 is stronger with thick paper, and the output of the DC motor 22b is accordingly stronger (the pressing force is stronger), the controller 25 may set the threshold value to be larger than when thin paper is used. Also, since the upward pushing force of the paper S on the paper pressing member 22 is stronger when the paper S is wider, and the output of the DC motor 22b is accordingly stronger (the pressing force is stronger), the controller 25 may set the threshold value to be larger than when narrower paper is used.

According to the modified example, it is possible to directly determine, during the color measurement process (S108), whether the paper S is being pressed.

The controller 25 may also detect malfunctioning of the DC motor 22b on the basis of both the result of detection by the encoder 22g immediately after the DC motor 22b halts (prior to driving being restarted) and the result of detection by the encoder 22g after driving has been restarted.

Other

While the aforementioned embodiment primarily sets forth a color measurement device 20 provided with a paper pressing device 30, disclosure of a method of assessing the state of pressing of paper is included as well. The aforementioned embodiment is intended merely to aid in understanding of the invention, and should not be construed as limiting the invention. Modifications and improvements to the invention may be contemplated without departing from the spirit thereof, and such equivalents will be included within the scope of the invention, as shall be apparent.

A description has been provided in the above embodiment of an example in which the color measurement section transport motor and the DC motor 22b are deliberately halted at 4-second intervals during the color measurement process. However, no limitation is provided thereby; it is sufficient for the system to be set so that operation proceeds without control of the printer 1 being impeded. Therefore, in cases where, as in the printer 1, the system is set so that error information is communicated in cases where a given operation of a device connected via the interface section 10a or of the motor or another internal electronic component of the printer 1 is detected to have continued for a predetermined time, the color measurement section transport motor or the DC motor 22b may be halted at a time that is shorter than the set predetermined time.

The time for halting the color measurement section transport motor or the DC motor 22b is not limited to 0.1 second. Furthermore, it is possible to reduce the quantity of electrical current supplied to the DC motor rather than halt the supply of electrical current to the DC motor 22b. If the electrical current supplied to the DC motor 22b is reduced, the power output from the DC motor 22b will be reduced as well. At this time, because the paper pressing member 22 and the pressing mechanism 23 recover from elastic deformation, it is possible to detect malfunctioning of the DC motor 22b on the basis of the detection result obtained from the encoder 22g. Specifically, even if the quantity of electrical current supplied to the DC motor is reduced instead of the supply of electrical current to the DC motor 22b being halted, it is nevertheless possible to detect malfunctioning of the DC motor 22b on the basis of the result of detection by the encoder 22g.

In a case where the power output from the DC motor is reduced instead of the DC motor being halted, the controller 25 may change the amount by which the power output from the DC motor is reduced depending on the type of paper. For example, since the upward pushing force of the paper on the paper pressing member 22 is weaker when thin paper is used, the controller 25 may perform a greater reduction in power than when thick paper is used. Since the upward pushing force of the paper on the paper pressing member 22 is weaker when paper of narrow width is used, the controller 25 may perform a greater reduction in power than when paper of greater width is used.

In the embodiment described above, a DC motor is used as the power supply for outputting power to press the medium, but no limitation is imposed thereby. For example, instead of a motor that outputs force in a rotational direction, the power supply may be an actuator that outputs force in a linear direction. In this case, a linear encoder for detecting displacement in a linear direction may be used as the detection section for performing detection on the output section of the power supply.

A motor is used as the power supply in the aforementioned embodiment; however, no limitation is imposed thereby. For example, hydraulic-pressure-type power supplies may be used, as may power supplies that run on heat, steam, or gases.

What is claimed is:

1. A color measurement device for performing color measurement of a printed pattern printed onto a medium, the color measurement device comprising:
   a pressing member for pressing the medium, the pressing member being elastically deformable;
   a color measurement section for performing color measurement of the printed pattern;
   a power supply for outputting power for the pressing member to press the medium:
   a detection section for detecting an amount of displacement of power current output from an output section of the power supply; and
   a controller for controlling the pressing member to press the medium on which the printed pattern which was printed against the pressing member, and controlling the color measurement section to perform color measurement, the controller being adapted to detect a malfunction of the power supply on the basis of the amount of displacement of the output section observed at a state in which the power for the pressing member to press the medium has been reduced, the malfunction being detected, when the displacement of the output section is not observed, the controller being configured to output an error sign, when malfunction is detected.

2. The color measurement device according to claim 1, wherein the color measurement device is characterized by comprising a transmission section for decelerating the power of the power supply and transmitting the reduced power to the pressing member.

3. The color measurement device according to claim 1, wherein the color measurement section rests on the pressing member when the color measurement section performs color measurement of the printed pattern.

4. The color measurement device according to claim 3, wherein the controller reduces the power output by the power supply for the purpose of detecting a malfunction of the power supply when the color measurement section is resting on the pressing member.

5. The color measurement device according to claim 4, wherein the controller reduces the power output by the power supply for the purpose of detecting a malfunction of the power supply, while causing the color measurement section to perform color measurement of the printed pattern.

6. A method for detecting a malfunction of a color measurement device, comprising:

pressing a pressing member against a medium using power output by a power supply:

performing color measurement of a printed pattern printed onto the medium being pressed by the pressing member;

detecting by a detection section an amount of displacement of power current output by the power supply;

detecting a malfunction of the power supply on the basis of a detection result of a detection section for detecting the amount of the displacement of the output section observed at a state in which the power for the pressing member to press the medium has been reduced; and outputting an error sign, when malfunction is detected, the malfunction being detected, when the displacement of the output section is not observed.

7. The color measurement device according to claim 1, wherein:

the controller is adapted to detect a malfunction of the power supply on the basis of the amount of displacement of the output section observed at a state in which the pressing member is pressed against the medium and at a state in which the power has been reduced.

8. The color measurement device according to claim 1, wherein the output section is a motor having a rotation axis, the displacement is observed, when the rotation axis is moved.

9. The color measurement device according to claim 1, wherein the displacement is a change in a position of the output section.

* * * * *